(12) United States Patent
Huang

(10) Patent No.: US 9,389,608 B2
(45) Date of Patent: Jul. 12, 2016

(54) LOADING AND UNLOADING METHOD AND DEVICE FOR A COOLING BUFFER IN A PRECISE LENGTH MEASURING MACHINE

(71) Applicant: Shenzhen China Star Optoelectronics Technology Co., Ltd., Shenzhen, Guangdong (CN)

(72) Inventor: Wende Huang, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 230 days.

(21) Appl. No.: 14/346,736

(22) PCT Filed: Jan. 9, 2014

(86) PCT No.: PCT/CN2014/070351
§ 371 (c)(1),
(2) Date: Mar. 23, 2014

(87) PCT Pub. No.: WO2015/058471
PCT Pub. Date: Apr. 30, 2015

(65) Prior Publication Data
US 2015/0112477 A1    Apr. 23, 2015

(30) Foreign Application Priority Data
Oct. 23, 2013 (CN) .......................... 2013 1 0502553

(51) Int. Cl.
*G06F 7/00*      (2006.01)
*G05B 19/418*    (2006.01)
*G02F 1/13*      (2006.01)

(52) U.S. Cl.
CPC ........ *G05B 19/41865* (2013.01); *G02F 1/1303* (2013.01); *G05B 2219/32266* (2013.01); *G05B 2219/45031* (2013.01); *Y02P 90/20* (2015.11)

(58) Field of Classification Search
USPC ......................................................... 700/214
See application file for complete search history.

(56) References Cited

U.S. PATENT DOCUMENTS

| | | | | | |
|---|---|---|---|---|---|
| 5,975,740 | A * | 11/1999 | Lin | ........................ | G06Q 10/06 414/936 |
| 6,074,443 | A * | 6/2000 | Venkatesh | ........ | G05B 19/41865 29/25.01 |
| 6,201,998 | B1 * | 3/2001 | Lin | ........................ | G06Q 10/06 204/192.1 |
| 6,360,132 | B2 * | 3/2002 | Lin | ........................ | G06Q 10/06 204/298.25 |
| 6,449,520 | B1 * | 9/2002 | Lin | ........................ | G06Q 10/06 204/298.33 |
| 6,580,955 | B2 * | 6/2003 | Lin | ........................ | G06Q 10/06 29/25.01 |

* cited by examiner

*Primary Examiner* — Kyle Logan
(74) *Attorney, Agent, or Firm* — Andrew C. Cheng

(57) ABSTRACT

The present invention provides loading and unloading method and device for a cooling buffer in a precise length measuring machine. The loading and unloading method contains the steps of: S1: triggering a timer after a glass substrate is loaded into an empty slot of the cooling buffer having the highest priority; and S2: after the timer reaches a first time T1, starting the loading of a glass substrate into another empty slot having the next highest priority. The loading and unloading method and device disclosed by the present invention, through the design of delayed loading and unloading glass substrates into and from the cooling buffer, enhances the intelligence of the cooling buffer, ensures the uniformity of the cooling intervals of the glass substrates, improves the measurement precision, satisfies operator's advanced operational requirement, and achieves high utilization of the precise length measuring machine.

13 Claims, 2 Drawing Sheets

S1 — Triggering a timer after a glass substrate is loaded into an empty slot of the cooling buffer having the highest priority S2 — After the timer reaches a first time T1, starting the loading of a glass substrate into another empty slot having the next highest priority

LOADING AND UNLOADING METHOD AND DEVICE FOR A COOLING BUFFER IN A PRECISE LENGTH MEASURING MACHINE

This application claims the benefit of People's Republic of China patent application No. 201310502553.2, filed on Oct. 23, 2013, which application is incorporated by reference herein in its entirety.

BACKGROUND OF THE INVENTION

1. Field of the Invention

The present invention generally relates to image display technique, and particularly relates to loading and unloading method and device for a cooling buffer in a precise length measuring machine.

2. The Related Arts

TTP (Total Pitch, inch long) precise length measuring machine is an important optical measurement apparatus in a TFT-LCD (Thin Film Transistor Liquid Crystal Display) manufacturing process. It is for the measurement of the total pitch when producing the first layer pattern of a TFT/CF (Color Filter) substrate by exposure. The total pitch measurement is achieved by measuring the interference pattern produced by the laser Michelson interference. The stability of laser is known to be susceptible to temperature variation. Therefore it is required that the TTP machine and the glass substrate to be measured have to be maintained at 23±0.1° C. Usually the TTP machine is kept in a room of constant temperature, and the glass substrate is loaded into a cooling buffer above the TTP machine first. After the glass substrate is cooled at a constant temperature it is then unloaded from the cooling buffer and mounted onto the TTP machine for measurement. If the cooling buffer fails to keep the glass substrate at the constant temperature or the temperature is different from that of the TTP machine, the thermal expansion and contraction effect to the glass substrate after it is mounted onto the TTP machine may affect the precision and reliability of the total pitch measurement. As such, a reliable and intelligent cooling buffer is required to the production of high-quality TFT/CF substrate.

Conventionally the cooling buffer of a TTP machine has four slots. The cooling buffer can be enabled or disabled, and a constant temperature interval can be configured (for the entire buffer, not for a particular slot). After the cooling buffer is activated, all empty slots are ready for loading sequentially. A loaded glass substrate, after being stored in a slot for the constant temperature interval, is unloaded by a robot and mounted onto the TTP machine for measurement. There is a disadvantage in the foregoing process.

The glass substrate in each slot is actually not held for the same cooling interval. Therefore, the glass substrates measured are of different conditions, leading to abnormal variance in the measurement results. This is due to the following problem. Let's assume that the cooling interval is 20 minutes, the measurement interval on the TTP machine is 10 minutes, and the four slots are loaded with four glass substrates sequentially (usually, there is a 30 seconds delay between two consecutive loadings, but this delay is ignored and the glass substrates are assumed to be loaded simultaneously). After the cooling interval for the glass substrate in slot 1 expires, it is mounted onto the TTP machine first and is measured for 10 minutes. Then the glass substrate in slot 2 is mounted onto the TTP but the glass substrate in slot 2 has already been in the cooling buffer for 20+10=30 minutes. Similarly, the glass substrates in slots 3 and 4 will be held for 40 and 50 minutes. In other words, the four glass substrates are cooled for different amount of time. In real-life production environment, it is found that, due to the influence by the precision of temperature control (23±1° C.) and the baking process, a glass substrate will be measured differently if it is cooled in the cooling buffer from 0 to 40 minutes, and the measurement would be stable after it is cooled about 40 minutes later. However, due to the tact time of production line and the timeliness of measurement data, it is rare to set the constant temperature interval to be more than 40 minutes.

As described above, the industry requires a loading and unloading mechanism that can keep a uniform cooling interval for the glass substrates so as to enhance the measurement precision.

SUMMARY OF THE INVENTION

The technical issue to be addressed is to provide loading and unloading method and device for a cooling buffer in a precise length measuring machine that can keep a uniform cooling interval for the glass substrates so as to enhance the measurement precision.

To address the technical issue, the present invention provides a loading and unloading method for a cooling buffer in a precise length measuring machine, which contains the steps of: S1: triggering a timer after a glass substrate is loaded into an empty slot of the cooling buffer having the highest priority; and S2: after the timer reaches a first time T1, starting the loading of a glass substrate into another empty slot having the next highest priority.

The loading and unloading method further contains the following step before the step S1: setting a priority to each slot of the cooling buffer.

The slots of the cooling buffer jointly form a delayed loading cycle.

T1 is equal to or slightly larger than T, which is the amount of time in measuring a single glass substrate on the precise length measuring machine plus the amount of time for mounting and dismounting the glass substrate onto and from the precise length measuring machine.

The step S1 further contain the steps of:

after the glass substrate is loaded into the empty slot of the cooling buffer having the highest priority, producing a Receive Complete signal; and the Receive Complete signal triggers the timer.

The step S2 further contains the steps of:

after the timer reaches the first time T1, producing a Receive Able signal that starts the loading of a glass substrate into another empty slot having the next highest priority; and after a glass substrate is cooled and unloaded from a slot, producing a Receive Disable signal for the slot so that it is disabled to prevent loading until the timer is triggered for loading the slot.

When an empty slot in the cooling buffer is abnormal, the slot is disabled;

When a slot is disabled, it is removed from the delayed loading cycle; when the slot becomes normal, it is set to the Receive Disable state, joins the delayed loading cycle, and waits for a slot having a level higher priority to trigger the timer for its delayed loading.

If a slot is disabled after the timer has been triggered for its loading, the timer for loading a slot of the next highest priority is triggered simultaneously at the time of disablement; and, when T1 expires, the loading to the slot of the next highest priority is started.

If the slot of the next highest priority is already occupied by a glass substrate for cooling, the timer for the slot's loading is triggered after the occupying glass substrate is unloaded.

After a glass substrate has been loaded into a slot, a Send Start signal is produced to unload the glass substrate immediately.

The present invention provides another loading and unloading method, which contains the steps of: after a glass substrate is loaded into an empty slot of the cooling buffer having the highest priority, producing a Receive Complete signal; triggering a timer; and after the timer reaches a first time T1, producing a Receive Able signal that starts the loading of a glass substrate into another empty slot having the next highest priority.

The present invention also provides a loading and unloading device for a cooling buffer in a precise length measuring machine. The loading and unloading device contains an activation unit and a timing unit, wherein the activation unit triggers the timing unit to start counting time after a glass substrate is loaded into an empty slot of the cooling buffer having the highest priority; and the timing unit, after reaching the first time T1, starts the loading of a glass substrate into another empty slot having the next highest priority.

The activation unit contains:

a first signal production unit produces the Receive Complete signal that triggers the timing unit after a glass substrate is loaded into an empty slot of the cooling buffer having the highest priority; and a second signal production unit, after the timing unit reaches the first time T1, produces the Receive Able signal that starts the loading of a glass substrate into another empty slot having the next highest priority.

The loading and unloading device further contains:

an advanced unloading unit that, after a glass substrate has been loaded into a slot, produces a Send Start signal to unload the glass substrate immediately.

The loading and unloading device further contains:

a disablement unit that, when an empty slot is abnormal, disables the slot.

The loading and unloading method and device for the cooling buffer in the precise length measuring machine disclosed by the present invention, through the design of loading and unloading glass substrates into and from the cooling buffer, enhances the intelligence of the cooling buffer, ensures the uniformity of the cooling intervals of the glass substrates, improves the measurement precision, satisfies operator's advanced operational requirement, and achieves high utilization of the TTP machine.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
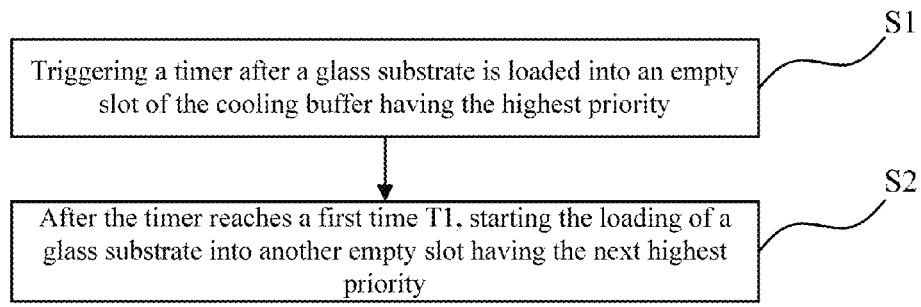
FIG. 1 is a flow diagram showing the steps of a loading and unloading method for a cooling buffer in a precise length measuring machine according to an embodiment of the present invention.

Together with the accompanied drawings, detailed description to the embodiments of the present invention is provided as follows FIG. 1 is a flow diagram showing the steps of a loading and unloading method for a cooling buffer in a precise length measuring machine according to an embodiment of the present invention. The method contains the following steps.

In step S1, after loading a glass substrate into an empty slot of the cooling buffer having the highest priority, a timer is triggered.

In step S2, after the timer reaches a first time T1, the loading of a glass substrate into another empty slot having the next highest priority is started.

To resolve the problem of glass substrates in different slots having different cooling intervals, the method specifies different priorities to the slots, and provides Tact Time Timer to set tact time between slots of different priorities. For example, the slots in the present embodiment is numbered from 1 to 4, and their respective priorities are such that slot 1 will be loaded first, then slot 2, slot 3, slot 4, and the sequence is cycled to slot 1 again, and so on. The highest priority and the next highest priority are two consecutive priorities. For example, slot 1 has the highest priority and the slot having the next highest priority is slot 2. In other words, for slot 2, the slot having the priority one level higher is slot 1. The tact time is set to control the interval between the loadings of glass substrates into slots of consecutive priorities. In the present embodiment, this interval is denoted as T1, which is slightly larger than or equal to the interval T, the amount of time in measuring a single glass substrate on the TTP machine plus the amount of time for mounting and dismounting the glass substrate onto and from the TTP machine (T may be different depending on the TTP machine, and therefore can be set differently depending on the TTP machine). For example, the amount of measurement time on the TTP machine plus the amount of time for mounting and dismounting the glass substrate onto and from the TTP machine is 10 minutes, and T1 can be set to 10 minutes (or slightly larger, such as 11 minutes). On the other hand, the amount of cooling time a glass substrate is held in the cooling buffer is denoted as T2 (e.g., 20 minutes). The idea of the present invention is to delay the loading of a glass substrate into a slot of the next highest priority based on the amount of time spent on a previous glass substrate loaded into a slot of the highest priority, so that their cooling intervals will not be different. For example, after loading slot 1 of the highest priority, the loading of slot 2 of the next highest priority has to be delayed for T1 amount of time, and so on. The loading of slot 1 is also affected by the loading of slot 4, and the slots jointly form a delayed loading cycle. As such, the cooling intervals for all slots will all be T1, and the measurement performed by the TTP machine can be continued without idle, thereby achieving enhanced utilization of the TTP machine. If tact time is set to 0, the cooling buffer will behave just like a conventional cooling buffer.

Please note that "loading" means the placement of a glass substrate into a slot of the cooling buffer, and "unloading" or "expelling" means the retrieval of a glass substrate from a slot of the cooling buffer for mounting onto the TTP machine.

More specifically, the step S1 further contains the following step.

After loading a glass substrate into an empty slot of the cooling buffer having the highest priority, a Receive Complete signal is produced and it is the Receive Complete signal that triggers the timer.

More specifically, the step S2 further contains the following steps.

After the timer reaches a first time T1, a Receive Able signal is produced and it is the Receive Able signal that starts the loading of a glass substrate into another empty slot having the next highest priority.

After a glass substrate is cooled and unloaded from a slot, a Receive Disable signal is produced for the slot and the slot is disabled to prevent loading until the timer is trigger for loading the slot.

Please note that when the TTP machine and the cooling buffer are initially turned on, slot 1, as the start point of cyclic loading of glass substrates, it does not have the Receive Complete signal from slot 4 to trigger the timer. Therefore, when the TTP machine and the cooling buffer are initially turned on, slot 1's loading is not delayed. Also, when the TTP machine and the cooling buffer are initially turned on, all slots in the cooling buffer are empty, slot 1 is enabled, slots 2-4 are disabled, and the TTP machine is enabled. After the cyclic loading is started, the loading to the slots is then controlled by the various signals.

Figure 2:
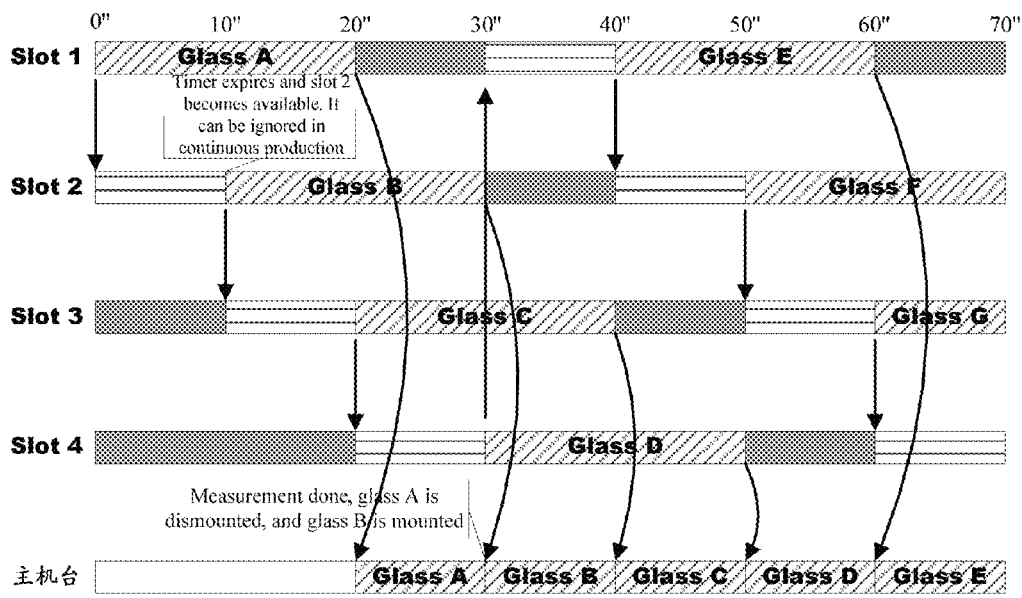
FIG. 2 is a time sequence diagram showing the method of FIG. 1.

FIG. 2 is a time sequence diagram showing the method of FIG. 1. Assuming T1=10 minutes and T2=20 minutes, at time 0", the loading of a glass substrate A (glass A) into slot 1 for cooling has finished. In the meantime, slot 1's Receive Complete signal is produced and the timer for scheduling the loading to slot 2, which is the next highest priority, is triggered. At time T1 (10"), as the amount of time for loading is small and as such is ignored, the loading of a glass substrate B (glass B) into slot 2 for cooling has finished, and slot 2's Receive Complete signal is produced and the timer for scheduling the loading to slot 3, which is the next highest priority, is triggered. In the same way, at time 20", slot 3's Receive Complete signal is produced and the timer for scheduling the loading to slot 4, which is the next highest priority, is triggered. In the meantime, the glass substrate A has been cooled for T2 amount of time, and is unloaded to be mounted onto the TTP machine. At time 30", slot 4's Receive Complete signal is produced and the timer for scheduling the loading to slot 1, which is the next highest priority, is triggered. In the meantime, the glass substrate B has been cooled for T2 amount of time, it is unloaded to be mounted onto the TTP machine, and the glass substrate A has also finished being measured on the TTP machine. As described, on one hand, the loading to each slot is delayed so that the glass substrates are cooled for the same amount of time, thereby achieving enhanced precision to the measurement. On the other hand, the glass substrates are continuously and seamlessly measured on the TTP machine, thereby achieving enhanced utilization.

According to the prior art, there is no advanced unloading function. Therefore, production efficiency can be significantly affected when abnormal glass substrate is to be unloaded or when the production line has to be emptied. The present embodiment overcomes this shortcoming by producing the Send Start signal. Specifically, after a glass substrate has been loaded into a slot, the glass substrate can be unloaded in advance by an operator triggering the production of the Send Start signal regardless of how long the glass substrate has been cooled. As such, an operator can speedily unload a glass substrate and empty the cooling buffer, so as to save the tact time and to conduct special measurement.

Additionally, according to the prior art, when a slot in the cooling buffer has abnormal mechanism or signal, the entire cooling buffer has to be disabled and the TTP machine cannot functional normally. As such, the present embodiment allows each slot to be disabled individually, and each slot can be set to switch between enabled and disabled states. This setting can only be applied when a slot is empty. When an empty slot has abnormal mechanism or signal, the slot is disabled whereas the other slots can still function normally. The enablement and disablement function of a slot can be achieved by the on/off switching to the inline enable signal of the slots.

Please note that, logically, the disablement function is actually in conflict with the delayed loading. A disabled slot will prevent the loading to a slot of the next highest priority and, successively, the entire cooling buffer cannot be loaded. To overcome this problem, the present embodiment provides a fool-proof logic as follows. When a slot is disabled, it is removed from the delayed loading cycle, and the loading control is applied to the remaining normal slots only. When the slot is normal again, it is set to the Receive Disable state and re-incorporated into the delayed loading cycle, waiting for a slot of one-level higher priority to trigger its delayed loading. For example, if slot 1 is abnormal and disabled, it is removed from the delayed loading cycle, and the remaining normal slots 2, 3, and 4 will still be used for cooling according to the delayed loading mechanism described above. When the slot 1 becomes normal, it is set to the Receive Disable state, becomes available for cooling, and waits for a slot having a level higher priority (slot 4) to trigger the timer for its loading.

If a slot is disabled after the timer has been triggered for its loading, then, at the time of disablement, the timer for loading a slot of the next highest priority is triggered simultaneously. When T1 expires, the loading to the slot of the next highest priority is started. If the slot of the next highest priority is already occupied by a glass substrate for cooling, the timer for the slot's loading is triggered after the occupying glass substrate is unloaded.

Figure 3:
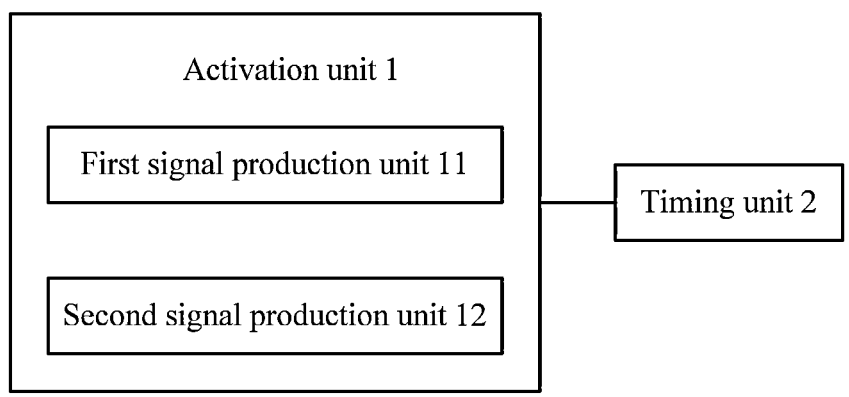
FIG. 3 is a functional block diagram showing a loading and unloading device for a cooling buffer in a precise length measuring machine according to another embodiment of the present invention.

FIG. 3 is a functional block diagram showing a loading and unloading device for a cooling buffer in a precise length measuring machine according to another embodiment of the present invention. As illustrated, the device contains an activation unit 1 and a timing unit 2. The activation unit 1 triggers the timing unit 2 to start counting time after a glass substrate is loaded into an empty slot of the cooling buffer having the highest priority. The timing unit 2, after reaching the first time T1, starts the loading of a glass substrate into another empty slot having the next highest priority.

Specifically, the activation unit 1 contains the following components.

A first signal production unit 11 produces the Receive Complete signal that triggers the timing unit 2 after a glass substrate is loaded into an empty slot of the cooling buffer having the highest priority.

A second signal production unit 12, after the timing unit 2 reaches the first time T1, produces the Receive Able signal that starts the loading of a glass substrate into another empty slot having the next highest priority.

The present embodiment further contains an advanced unloading unit that, after a glass substrate has been loaded into a slot, produces the Send Start signal to unload the glass substrate immediately.

The present embodiment further contains a disablement unit that, when an empty slot has abnormal mechanism or signal, disables the slot.

The operation principle, process, and advantage of the device of the present embodiment are identical to the previous embodiment, and the details are omitted here.

The loading and unloading method and device for the cooling buffer in the precise length measuring machine disclosed by the present invention, through the design of loading and unloading glass substrates into and from the cooling buffer, enhances the intelligence of the cooling buffer, ensures the uniformity of the cooling intervals of the glass substrates, improves the measurement precision, satisfies operator's advanced operational requirement, and achieves high utilization of the TTP machine.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A loading and unloading method for a cooling buffer in a precise length measuring machine, comprising the steps of:
    S1: triggering a timer after a glass substrate is loaded into an empty slot of the cooling buffer having the highest priority; and
    S2: after the timer reaches a first time T1, starting the loading of a glass substrate into another empty slot having the next highest priority.

2. The loading and unloading method as claimed in claim 1, further comprising the following step before the step S1:
    setting a priority to each slot of the cooling buffer.

3. The loading and unloading method as claimed in claim 1, wherein, after a glass substrate has been loaded into a slot, a Send Start signal is produced to unload the glass substrate immediately.

4. The loading and unloading method as claimed in claim 1, wherein the slots of the cooling buffer jointly form a delayed loading cycle.

5. The loading and unloading method as claimed in claim 4, wherein T1 is equal to or slightly larger than T, which is the amount of time in measuring a single glass substrate on the precise length measuring machine plus the amount of time for mounting and dismounting the glass substrate onto and from the precise length measuring machine.

6. The loading and unloading method as claimed in claim 4, wherein the step S1 further comprises the steps of:
    after the glass substrate is loaded into the empty slot of the cooling buffer having the highest priority, producing a Receive Complete signal; and
    the Receive Complete signal triggers the timer.

7. The loading and unloading method as claimed in claim 6, wherein the step S2 further comprises the step of:
    After the timer reaches the first time T1, producing a Receive Able signal that starts the loading of a glass substrate into another empty slot having the next highest priority.

8. The loading and unloading method as claimed in claim 7, wherein the step S2 further comprises the step of:
    after a glass substrate is cooled and unloaded from a slot, producing a Receive Disable signal for the slot so that it is disabled to prevent loading until the timer is triggered for loading the slot.

9. The loading and unloading method as claimed in claim 4, wherein, when an empty slot in the cooling buffer is abnormal, the slot is disabled.

10. The loading and unloading method as claimed in claim 9, wherein, when a slot is disabled, it is removed from the delayed loading cycle; when the slot becomes normal, it is set to the Receive Disable state, joins the delayed loading cycle, and waits for a slot having a level higher priority to trigger the timer for its delayed loading.

11. The loading and unloading method as claimed in claim 9, wherein, if a slot is disabled after the timer has been triggered for its loading, the timer for loading a slot of the next highest priority is triggered simultaneously at the time of disablement; and, when T1 expires, the loading to the slot of the next highest priority is started.

12. The loading and unloading method as claimed in claim 11, wherein, if the slot of the next highest priority is already occupied by a glass substrate for cooling, the timer for the slot's loading is triggered after the occupying glass substrate is unloaded.

13. A loading and unloading method for a cooling buffer in a precise length measuring machine, comprising the steps of:
    after a glass substrate is loaded into an empty slot of the cooling buffer having the highest priority, producing a Receive Complete signal;
    triggering a timer; and
    after the timer reaches a first time T1, producing a Receive Able signal that starts the loading of a glass substrate into another empty slot having the next highest priority.

* * * * *